United States Patent [19]

Shurling, Jr. et al.

[11] Patent Number: 5,232,495
[45] Date of Patent: Aug. 3, 1993

[54] METHOD OF PRODUCING AGGREGATED KAOLINITE PIGMENT USING ORGANIC SILICON COMPOUNDS

[75] Inventors: Dickey S. Shurling, Jr., Sandersville; Alan J. Brown, Milledgeville; E. Wayne Andrews, Sandersville, all of Ga.

[73] Assignee: ECC International Inc., Atlanta, Ga.

[21] Appl. No.: 877,541

[22] Filed: May 1, 1992

[51] Int. Cl.⁵ .......................... C09C 3/12; C08K 3/34; C08K 9/08; C08K 9/06
[52] U.S. Cl. .................................. 106/487; 106/416; 106/442; 106/464; 106/465; 106/468; 106/486; 428/454; 501/141; 501/144; 501/145; 501/146; 501/147; 501/148; 501/149
[58] Field of Search ............... 106/416, 442, 464, 465, 106/468, 486, 487; 428/454; 501/141, 144, 145, 146, 147, 148, 149

[56] References Cited

U.S. PATENT DOCUMENTS

| 3,364,059 | 1/1968 | Marzocchi | 428/391 |
|---|---|---|---|
| 3,567,680 | 3/1971 | Iannicelli | 524/262 |
| 3,834,924 | 6/1972 | Grillo | 106/490 |
| 3,894,882 | 7/1975 | Takewell et al. | 106/485 |
| 4,026,762 | 5/1977 | Bauman | 162/181.2 |
| 4,028,173 | 6/1977 | Olson | 162/181.2 |
| 4,381,948 | 5/1983 | McConnell et al. | 106/416 |
| 4,810,578 | 3/1989 | Prescott et al. | 106/487 |
| 4,818,294 | 4/1989 | Raythatha et al. | 106/487 |
| 4,826,536 | 5/1989 | Raythatha et al. | 106/465 |
| 4,935,062 | 6/1990 | Brown et al. | 106/487 |

OTHER PUBLICATIONS

Preserving Our Heritage in Stone G. S. Wheeler et al., "Analytical Chemistry", vol. 64, No. 5, Mar. 1, 1992 pp. 347-356.

Primary Examiner—Mark L. Bell
Assistant Examiner—Scott L. Hertzog
Attorney, Agent, or Firm—Klauber & Jackson

[57] ABSTRACT

An improved process for producing a aggregated kaolin pigment having desired physical and optical characteristics when used as a coating, filler or pigment in paper. The aggregated pigment is produced by mixing an aqueous slurry of a fine particle kaolin with a previously hydrolyzed organic silicon compound, such as hydrolyzed tetraethoxysilane, and then spray drying the mixture to form a dry, chemically aggregated kaolin pigment.

16 Claims, 1 Drawing Sheet

METHOD OF PRODUCING AGGREGATED KAOLINITE PIGMENT USING ORGANIC SILICON COMPOUNDS

BACKGROUND OF THE INVENTION

This invention relates to the preparation of chemically aggregated kaolin pigments, using organo-silicon compounds. The products are useful as fillers and coatings for paper.

Kaolinite occurs naturally as clay, which is mined and processed to produce kaolin pigments for use in paper filling and paper coating applications. In general, the objectives of using a kaolin pigment are to improve qualities of the paper product, such as opacity, brightness, smoothness, printing, porosity, surface coverage, light scatter, and to reduce the cost of paper manufacturing. Various methods are commonly employed to enhance the performance of a given kaolin pigment. Among these are calcining and chemical aggregating methods which improve the brightness and opacity imparted to paper by a given kaolin pigment.

The brightness and opacity imparted to paper by a given kaolin filler are quantitatively related to a property of the filler identified as the "scattering coefficient S." This scattering coefficient S of a given filler pigment is a property well known and extensively utilized in the paper technology art, and has been the subject of numerous technical papers. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection, e.g., to U.S. Pat. Nos. 4,026,726 and 4,028,173. In addition to the citations set forth in these patents, reference may further be had to Pulp and Paper Science Technology, Vol. 2, "Paper," Chapter 3, by H. C. Schwalbe (McGraw-Hill Book Company, N. Y.).

In a filled paper, higher light scattering allows paper to look more opaque without increasing light absorption. The use of pigment with a higher light scattering coefficient allows reduction in either the basis weight or amount of filler required to achieve targeted properties; for example, opacity and brightness. Traditionally, this has been achieved using titanium dioxide, calcined clays and precipitated calcium carbonate. The relatively higher light scattering of titanium dioxide is due to higher refractive index. Higher light scatter observed with calcined kaolin and precipitated calcium carbonate is believed to be due to the intrinsic porous structure developed during the process of manufacturing of these pigments. See McConnell et al, U.S. Pat. No. 4,381,948.

In general, the attempt to increase light scatter by modification of kaolinite mineral also induces some increase in pore void volume. In addition, such modification can produce pigments with particle size distribution in a fairly narrow range. For example, calcining of fine kaolinite above its dehydroxylation point can produce a product with increased pore void volume. In U.S. Pat. No. 4,826,536, issued May 2, 1989, to Raythatha et al., similar aggregation is achieved chemically by reacting fine kaolinite clay with rapidly hydrolyzing metal chlorides. The acidic byproduct of this reaction may be neutralized with gaseous ammonia. In Raythatha et al., U.S. Pat. No. 4,818,294, and in Brown et al., U.S. Pat. No. 4,935,062, similar aggregates may be produced by reaction with organo-silicon compounds that are non-corrosive and produce no solid byproducts. The light scattering coefficient and pore void volumes of these clays are significantly higher than the starting kaolinite material.

Marginal increase in light scatter (generally less than 10 units) may be induced by mixing kaolinite particles of different size or by chemical flocculation. However, these structures are generally unstable and would break down under the high shear stress of paper making or paper coating.

Aside from use as fillers, the aggregated pigments are used in paper coating to improve surface coverage. The application of such pigments can lead to a smoother surface, higher porosity, gloss and print properties. In Raythatha 4,818,294 a chemically aggregated kaolin pigment is shown to significantly increase coated sheet properties, especially paper and print gloss.

In more detail, in U.S. Pat. No. 4,381,948 to McConnell et al., a calcined kaolin pigment and a method for manufacture of same are disclosed. The said pigment consists of porous aggregates of kaolin platelets, and exhibits exceptionally high light scattering characteristics when incorporated as a filler in paper. This pigment, which substantially corresponds to the commercially available product ALPHATEX ® of the present assignee, E.C.C. America Inc. (Atlanta, Ga.), is prepared by first blunging and dispersing an appropriate crude kaolin to form an aqueous dispersion of same. The blunged and dispersed aqueous slurry is subjected to a particle size separation from which there is recovered a slurry of the clay, which includes a very fine particle size; e.g. substantially all particles can be smaller than 1 micrometer E.S.D. The slurry is dried to produce a relatively moisture-free clay, which is then thoroughly pulverized to break up agglomerates. This material is then used as a feed to a calciner; such feed is calcined under carefully controlled conditions to typical temperatures of at least 900° C. The resulting product is cooled and pulverized to provide a pigment of the porous high light scattering aggregates of kaolin platelets as described.

Calcined kaolin products, including those of the aforementioned ALPHATEX ® type, are seen to be manufactured by relatively complex techniques involving a multiplicity of steps, including specifically a calcining step, plus various preparatory steps and post-calcining steps. Thus, the said product is relatively expensive to produce, and requires considerable investment in complex apparatus and the like; e.g. highly regulated calciners, etc. The particle size in the feed to the calciner must be carefully controlled, because a relatively small increase in coarseness of such feed can have very marked detrimental effect on Valley abrasion. Furthermore, calcination per se will produce an abrasive product if overheating occurs. Consequently, the conditions of preparation of calcined materials must be very carefully controlled in order to keep abrasion acceptably low in the calcined product.

In Raythatha 4,826,536, a process is disclosed in which a fine particle size kaolin is reacted in particulate form with a metal chloride, such as silicon tetrachloride, to form a chemically aggregated structured kaolin pigment. The metal chloride may be one or more of the chlorides having the general formula $MCl_x$, where M is Si, Ti or Al; and X is 3 or 4 depending on the valence of M. Heating may optionally be used to shorten the reaction time. When so used, temperatures generally will not, however, exceed about 150° C. In order to complete the polymerization and condensation which is thought to occur, it is preferable to age the resulting product for a period, typically at least three days. In another aspect of that process, additional improvements in the products are found to occur by the addition of ammonia to the combined kaolin and metal chloride.

Thus *Raythatha* 4,826,536 describes methods of preparing chemically aggregated kaolinite pigment using very reactive metal chlorides such as silicon tetrachloride and titanium tetrachloride. The application of such reactive metal chloride leads to aggregated products that give enhanced optical and printability properties for filled and coated papers. However, due to the nature of the aggregating chemical, very specialized equipment and processing steps are required. In addition, the resultant by-products are difficult to remove by ordinary methods. Furthermore, the aggregated kaolinite pigment product cannot be dispersed effectively in water at solids contents above 50 weight percent, which is an impediment to their shipping and use.

In *Raythatha* 4,826,536, free moisture present in the particulate feed is useful to initiate at least a partial hydrolysis of the metal chloride or chlorides. The patentee indicates that if the moisture level is too high, however, it can diminish or impair the efficiency of the aggregation process. Thus in the instances where silicon and/or titanium chlorides are used, if the moisture level is too high relative to the metal chloride(s), then the hydrolysis products from the metal chlorides will predominantly precipitate as the metal oxide, i.e. as silica gel and/or titania. In the case of aluminum trichloride, if the moisture level is too high relative to the metal chloride, then the dilution of the finally resulting aluminum hydroxide (in the presence of ammonia) can be so high as to cause inefficient aggregation.

*Raythatha* 4,818,294 discloses a method of producing aggregated kaolin pigments using organo-silicon compounds either singly or in combination. In general, the compounds may be selected from symmetric compounds having the formula

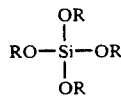

where R=CH$_3$, C$_2$H$_5$, C$_3$H$_7$, n—C$_4$H$_9$ sec-C$_4$H$_9$ and C$_6$H$_5$ and asymmetric compounds having the formula

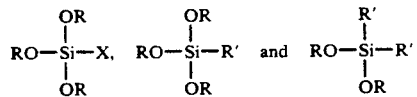

where R=C$_2$H$_5$, X=Cl or Br, and R'=H.

In a typical process, substantially dry kaolin mineral is treated with an effective amount of an organo-silicon compound such as silanes having the formula (RO)$_4$Si, where R is a lower alkyl group of 1 to 4 carbon atoms; e.g., methyl (CH$_3$) or ethyl (CH$_3$CH$_2$). The R groups in the silane can be the same or different. The resulting products exhibit increased light scatter, improved wet void volume and bulk, and have a structure that is strong enough to withstand the high shear forces of paper making and paper coating. The amount of organic silicon compound may range from 0.1 to 3.0%, preferably from 0.2 to 2.0% by weight of dry kaolin.

*Raythatha* 4,818,294 also teaches that aggregation enhancing chemicals, comprising alkaline earth metal salts and lithium chloride, may optionally be used, in amounts in the range of 0.05 to 3.0%, typically 0.05 to 2% by weight of the salt based on the weight of the dry kaolin.

*Raythatha* 4,818,294 further teaches that feed moisture is typically in the range of 1 to 2%, preferably 1.0 to 1.75%, by weight of the feed clay The most preferred range is 1.5 to 1.75 % by weight of the clay. *Brown* 4,935,062, a continuation-in-part of *Raythatha* 4,818,294, discloses that the organo-silicon compounds of *Raythatha* 4,818,294 are useful for producing aggregated kaolin pigments by the method of the *Raythatha* 4,818,294 patent when the moisture content of the feed is increased into the range of 2.0 to 5.0% by weight of the clay. *Brown* further teaches that moisture content above 5% causes the clay to become sticky and difficult to handle.

Thus *Raythatha* 4,826,536, *Raythatha* 4,818,294 and *Brown* 4,935,062 all disclose and teach that aggregated kaolin pigments can be produced by treating a kaolin clay with organo-silane or metal chloride compounds in the presence of a quantity of water that is sufficient to hydrolyze and polymerize the organo-silane or metal chloride compounds, i.e. up to about 5% of the weight of clay. These patents teach that it is necessary to restrict the amount of moisture used, and *Raythatha* 4,826,536 teaches that when higher amounts of moisture are present the hydrolysis products formed are ineffective for producing aggregated pigment. Using the prior art of *Brown* 4,935,062, one would process the crude clay to a dried product, and then mix in the selected organo-silane to produce an aggregated product. In practice this procedure has been found to require an aging period of at least three days from the time the clay is treated until it can be used—e.g. in paper coating. This has resulted in severe impediments to ease of production and use of the pigments.

Additional prior art pertinent to the present invention includes:

U.S. Pat. No. 3,567,680, issued to Joseph Iannicelli disclosing that mercaptopropyl silanes having the formula:

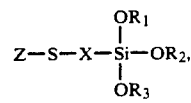

wherein Z is selected from the group consisting of hydrogen, cation, alkyl, aryl, alkylaryl, arylalkyl and derivatives thereof; X is selected from the group consisting of alkyl, alkylaryl, and arylalkyl; and R1, R2 and R3 are selected from the group consisting of hydrogen, cation and alkyl, are suitable for modifying kaolin clays to enable them to be used as reinforcing fillers for elastomers. It may be noted that in *Iannicelli*, only the trialkoxy mercaptopropyl silanes are considered. Blends of these mercapto organosilanes with amino organosilanes are also disclosed.

U.S. Pat. No. 3,364,059 to *Marzocchi*, discloses a method for treating glass fibers to improve their bonding relationship to rubbers by treating them with a silane containing a thio group.

In U.S. Pat. No. 3,834,924 to *Thomas G. Grillo*, an amino organosilane is added to a high solids content pigment dispersion or slurry to change the slurry form into a thick, flocculated and plastic type that is suitable for extrusion and drying. Because a thick, cake-like product is formed, the amino organosilane and pigment dispersion are preferably mixed or blended directly in a solids mixing apparatus such as an extruder, designed to extrude the plastic mass in the form of a compacted rod type body which may be fed directly into a drier. The products are useful as a filler for polyurethanes. As can be seen, the described treatment is for the different purpose of forming a flocculated, plastic mass of the kaolin, not for the purpose of aggregating fine kaolin particles to form aggregated fine kaolin particles.

In U.S. Pat. No. 3,894,882 to *Robert B. Takewell et al.*, a rotating pelletizing drum is used to form pellets from clay such as kaolin clay. To avoid the problem of dust, a wetting liquid is introduced into the drum, preferably steam or steam/water. The steam adds heat to the pellets to aid in drying them. There is an incidental mention of using "other suitable wetting liquids", an extensive list being given which includes silanes.

In accordance with the foregoing, an object of the present invention is to provide an improved process for producing an aggregated kaolin pigment product which possesses improved pigment bulk, porosity and light scattering characteristics, and hence is useful as a bulking pigment for coating of paper and paper board, and which may also be used as an opacifier and light scattering filler for paper and paper board as well as in other paper manufacturing applications.

Another object is to provide a method which permits use of a simpler process with fewer process steps and faster processing than present calcining and chemical aggregation methods, by eliminating the necessity for aging, dry milling or calcining required by the present methods.

A further object of this invention is to provide a method for producing a chemically aggregated kaolin pigment by means of a process which permits treatment of an easily handled aqueous slurry in a wet process step, which is not possible with present methods, and which yet produces aggregates having sufficient strength to enable their effective use in coating applications.

SUMMARY OF THE INVENTION

Now in accordance with the present invention, a method is provided for producing a kaolin pigment having enhanced optical and printability properties when used in paper manufacture. Pursuant to the invention an aqueous slurry of a fine particle size kaolin is mixed with an aggregating agent comprising a previously hydrolyzed organo-silicon compound selected from the group consisting of symmetric compounds having the formula

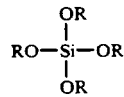

where R=CH$_3$, C$_2$H$_5$, C$_3$H$_7$, n—C$_4$H$_9$ and C$_6$H$_5$ and asymmetric compounds having the formula

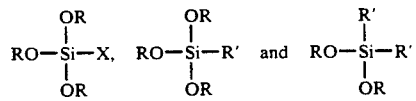

where R=C$_2$H$_5$, X=Cl or Br, and R'=H; and spray drying the mixture to recover an aggregated particulate kaolin pigment as product.

Preferred aggregating agents for use in the invention include tetramethoxy silane and tetraethoxy silane, each of which has been previously hydrolyzed.

The mixture of kaolin and organosilane preferably also includes an aggregation-enhancing agent selected from the group consisting of the alkaline earth metal salts. Preferable salts for such use are those of the divalent alkaline earth metals—calcium carbonate is especially preferred. From about 0.5 to 5% of the aggregation enhancing agent is usefully added, with 2–4% being preferred, and about 3% being typical.

In a typical process, an aqueous slurry of a fine particle size kaolin pigment (preferably including the aggregation-enhancing agent) is treated with an effective amount of a compound prepared by hydrolyzing an organosilane. Preferably at least 98% by weight of the feed particles are of less than 2µm E.S.D. and at least 96% are less than 1 µm E.S.D. The mixture typically contains 40 to 80% water and 0.5 to 5% hydrolyzed organosilane, based on the dry weight of kaolin. The mixture is spray dried in the same manner as untreated kaolin mineral. The resulting products when used in paper making, exhibit increased light scatter, improved wet void volume and bulk. The aggregates are found to have high structural integrity, i.e. they are strong enough to withstand the high shear forces of paper making and paper coating.

The organic silicon compound is hydrolyzed by mixing the compound with water in approximately a molar ratio to the silicon compound, preferably together with an alcohol having solvating properties for both the water and the silicon compound, and a catalytically active quantity of an acid or base catalyst for the hydrolysis. Although the hydrolysis can proceed in the absence of the alcohol, it is preferred to have same present in order to facilitate the reaction by completion within a commercially desirable brief duration. The alcohol can comprise among others, ethanol, methanol or isopropanol, with ethanol being particularly preferred because of its availability and relatively low toxicity. It is important to utilize the hydrolyzed organic silicon compound in a freshly prepared condition, as the nascent silicic acid which is formed during the hydrolysis will otherwise rapidly lose its activity for use in the present processes, as it begins to polymerize. The resulting hydrolyzed organic silicon compound is therefore preferably mixed with the slurry of kaolin within 24 hours of its hydrolysis, and more preferably within 14 hours of its hydrolysis.

The quantity of water added for the hydrolysis is preferably on about a mole to mole basis with the silicon compound, or slightly less where moisture on the clay can make up the difference. Excess water is preferably avoided, since it can prematurely hasten polymerization of the product with undesired precipitation.

BRIEF DESCRIPTION OF THE DRAWINGS

In the drawings appended hereto.

DESCRIPTION OF PREFERRED EMBODIMENTS

The invention is demonstrated in the following Examples which are intended to be illustrative but not limiting.

Preparation of Feed Clay

The starting crude material for the below Examples was a blend of crude kaolins which were derived from northeast Georgia, and which were comprised of very fine particle size materials. The GE brightness of the said crude was in the range of 82 to 87. In all instances in this specification it will be understood that brightness values are obtained according to the standard specification established by TAPPI procedure T-646 os-75.

The crude clays were beneficiated according to the general practice used in kaolinite processing industries. The crudes were thus first blunged and degritted, and thereupon were classified by centrifugation to 96% less than 1 micrometer E.S.D. and about 50-60% <0.25 micrometers E.S.D. (equivalent spherical diameter). The classified clays were flocculated by using 0.25% by weight of aluminum sulfate and adjusting the pH to 3.5 with sulfuric acid. The flocculated kaolinite was filtered. The significantly dried (about 20% moisture remains) kaolinite was redispersed with 0.25% by weight of sodium polyacrylate and the pH adjusted to about 7.0. 3% by weight of Carbital® 90, a ground calcium carbonate having a P.S.D. of 90% <2 μm, was added to the slurry as an aggregation enhancing agent. The redispersed kaolinite was then spray dried.

The feed clay from the foregoing was made into slurries with 40 to 80% solids and reacted with a solution of aggregating agent solution as described in the Examples. The treated feed clay was then spray dried to produce the aggregated pigment.

The relative sedimentation volume of treated and starting material was measured to determine the extent and nature of aggregation. In the procedure, a nearly 55% solids slurry of pigment was prepared that contained 0.3 milliliter of sodium polyacrylate. This slurry was then spun at 7000 rpm for 45 minutes. The sediment volume was calculated using dry weight of clay, wet weight of clay, and calculating volume of clay using density of dry clay of 2.6g/ml.

Example 1

Figure 1:
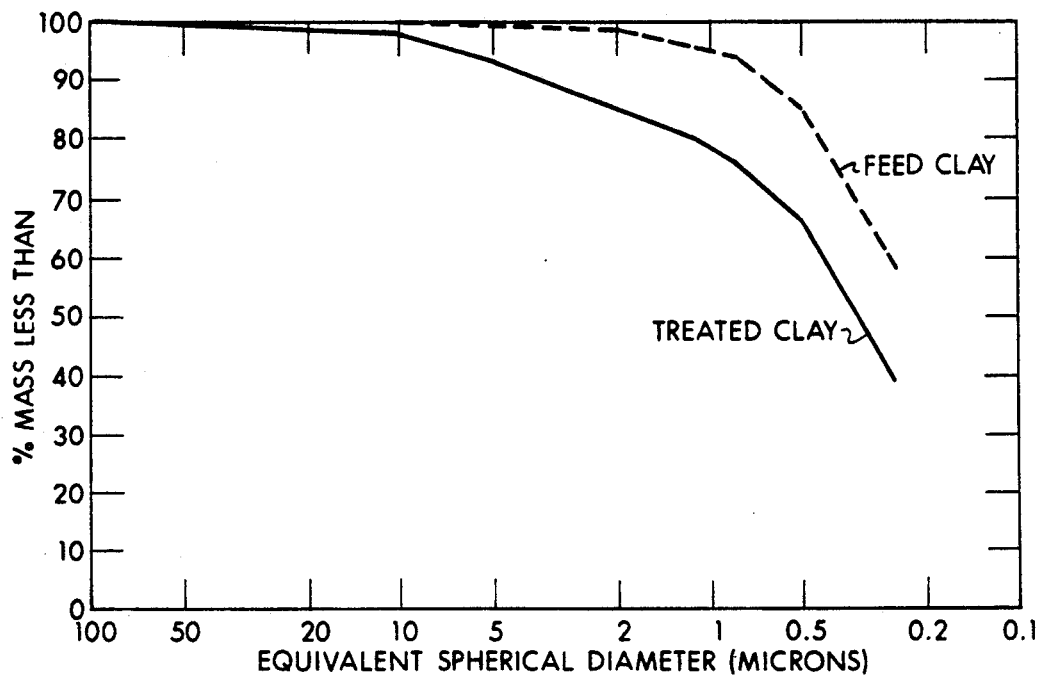
FIG. 1 is a graph which compares the particle size distributions for the starting feed clay and an aggregated product prepared by treatment with 5% equivalent tetraethoxysilane, as described in Example 1.

An aggregating agent solution was prepared by mixing 100 parts of tetraethoxysilane, 50 parts of ethyl alcohol, 17.5 parts of water and 200 parts per million of sulfuric acid. This aggregating agent solution was added to the feed clay in a slurry containing 60 weight % solids at a dosage of 5% of the dry equivalent weight of the feed clay. The mixture was diluted to 40 weight % solids content and spray dried. FIG. 1 depicts the particle size distribution (P.S.D.) of the product and of the feed clay, showing that the fraction below 0.25μm E.S.D. was reduced from 57% to less than 40% as a result of treatment with the aggregating agent.

When this aggregated product is used as a paper filler or as a paper coating pigment, as in the formulations of Examples 1 and 10 of U.S. Pat. No. 4,935,062, improvements in the normalized light scatter (for the filled sheets), and in such properties as sheet gloss, print gloss and opacity (for the coated sheets) can be obtained, as compared to use of the unaggregated feed clay.

Example 2

Figure 2:
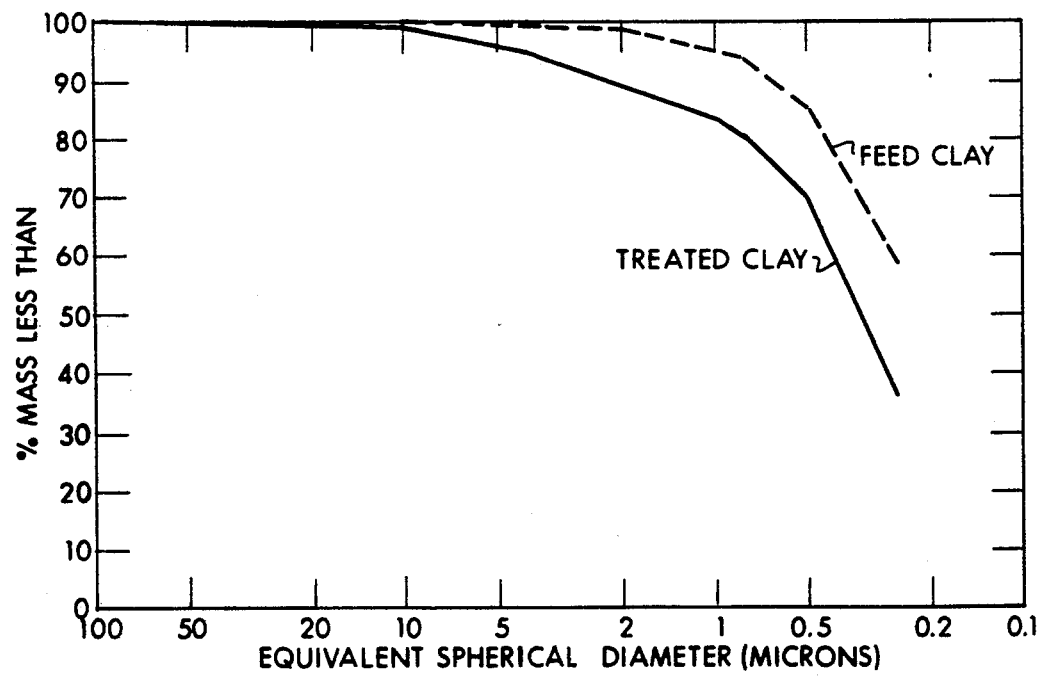
FIG. 2 is a graph similar to FIG. I, showing a corresponding result where tetraethoxysilane is used at a 3.67% addition level.

An aggregating solution was used to treat a feed clay slurry as in Example I above, except that 3.67% of the aggregating agent solution was added based on the dry equivalent weight of feed clay. Results were as shown in FIG. 2 from which it is seen that the sub- 0.25 μm content was reduced from about 55% for the feed clay, to about 35% for the aggregated product.

Example 3

A further aggregating agent solution was prepared by mixing 50 grams of tetraethoxysilane, 25 grams of ethyl alcohol, 8.8 grams of water and 0.23 grams of concentrated sulfuric acid. This mixture was allowed to react for 30 seconds with stirring in a Waring Blendor.. 19.1 ml of this aggregating agent solution was added to 500 grams (dry equivalent) of feed clay in a slurry containing 60 weight % water. After addition of the aggregating agent solution, mixing was carried out for fifteen minutes at 500 rpm. The mixture was diluted to 30 weight % solids content and mixed another fifteen minutes. The mixture was allowed to stand for thirty minutes, whereupon it was spray dried in a Britchi drier with inlet temperature of 200° C. and outlet temperature of 120° C.

The particle size distribution of the dried kaolin pigment was determined, and compared with the particle size distribution of the feed clay, showing that the fraction below 0.25 μm E.S.D. was reduced from 50% to 43.9% as a result of treatment with the aggregating agent. The somewhat lesser degree of aggregation found in this Example as compared with the results in Examples 1 and 2, is believed due to the very short 30 second reaction period—i.e. it is believed that hydrolysis was incomplete. In the presence of the solvating alcohol, about 2 to 3 minutes is typically required to complete hydrolysis.

While this invention has been particularly set forth in terms of specifices, it is understood in view of this disclosure, that numerous variations upon the invention are now enabled to those skilled in the art, which variations yet reside within the scope of the present teaching. Accordingly, the invention is to be broadly construed, and limited only by the scope and spirit of the clams now appended hereto.

What is claimed is:

1. A method for producing a chemically aggregated kaolin pigment providing enhanced optical and printability properties when used in paper manufacture, which comprises mixing an aqueous slurry of a fine particle size feed kaolin with an aggregating agent comprising a previously hydrolyzed organic silicon compound selected from the group consisting of symmetric compounds having the formula

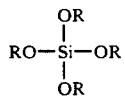

where R=CH$_3$, C$_2$H$_5$, C$_3$H$_7$, n--C$_4$H$_9$ sec-C$_4$H$_9$ and C$_6$H$_5$ and asymmetric compounds having the formula

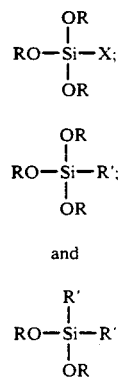

where R=C$_2$H$_5$, X=Cl or Br, and R'=H, and spray drying the mixture to recover an aggregated particulate kaolin pigment as product.

2. A method in accordance with claim 1, wherein said slurry includes 40 to 80% water by weight.

3. A method in accordance with claim 2, wherein said hydrolyzed silane is added as 0.5 to 5% by weight of said kaolin.

4. A method in accordance with claim 3, in which the organic silicon compound is hydrolyzed by mixing said compound with water in approximately a molar ratio to said silicon compound, together with a catalytically active quantity of an acid or base catalyst for said hydrolysis.

5. A method in accordance with claim 4, further including mixing with said silicon compound and water, an alcohol having solvating properties for both said water and said silicon compound.

6. A method in accordance with claim 5, in which said alcohol comprises ethanol.

7. A method in accordance with claim 5, in which said alcohol comprises methanol.

8. A method in accordance with claim 5, in which the resulting hydrolyzed organic silicon compound is mixed with said slurry of kaolin within 24 hours of its hydrolysis.

9. A method in accordance with claim 5, in which the resulting hydrolyzed organic silicon compound is mixed with said slurry of kaolin within 14 hours of its hydrolysis.

10. A method in accordance with claim 5, in which said organic silicon compound comprises tetraethoxysilane.

11. A method in accordance with claim 5, in which said organic silicon compound comprises tetramethoxysilane.

12. A method in accordance with claim 1 in which the kaolin feed particles are additionally mixed with an aggregation enhancing agent selected from the group consisting of the alkaline earth metal salts.

13. A method in accordance with claim 12, in which said aggregation enhancing agent comprises calcium carbonate.

14. A method in accordance with claim 12, in which the aggregation-enhancing agent is present in the range of from 0.5% to 5% by weight of the kaolin on a dry basis.

15. A method in accordance with claim 14, in which the aggregation-enhancing agent is present in the range of 2% to 4% by weight of the kaolin on a dry basis.

16. A method in accordance with claim 1, in which at least 98% by weight of the feed kaolin particles are finer than 2 micrometers E.S.D.

* * * * *